United States Patent
Bauman

(10) Patent No.: US 8,118,285 B2
(45) Date of Patent: Feb. 21, 2012

(54) GAS SPRING WITH INTEGRATED LEAD SCREW DRIVE

(75) Inventor: Walter Douglas Bauman, Wixom, MI (US)

(73) Assignee: AVM Industries, Marion, SC (US)

( * ) Notice: Subject to any disclaimer, the term of this patent is extended or adjusted under 35 U.S.C. 154(b) by 910 days.

(21) Appl. No.: 10/883,202

(22) Filed: Jul. 1, 2004

(65) Prior Publication Data
US 2006/0001202 A1   Jan. 5, 2006

(51) Int. Cl.
*F16F 7/00* (2006.01)

(52) U.S. Cl. ............ 267/64.12; 188/130; 188/322.19; 188/322.22

(58) Field of Classification Search ........... 188/196 V, 188/202, 203, 315, 129, 130, 300, 322.19, 188/322.22; 267/64.12, 120, 195, 205; 296/146.4, 296/146.8; 16/82, 85; 92/31, 33, 519; 91/31, 91/33, 519
See application file for complete search history.

(56) References Cited

U.S. PATENT DOCUMENTS

| | | | | |
|---|---|---|---|---|
| 1,025,388 | A * | 5/1912 | Finnell et al. | 267/200 |
| 1,218,197 | A * | 3/1917 | MacKinley | 16/85 |
| 3,232,597 | A * | 2/1966 | Gaydecki | 267/219 |
| 3,610,376 | A * | 10/1971 | Baronnet et al. | 188/202 |
| 3,794,309 | A * | 2/1974 | Chrokey et al. | 267/34 |
| 3,834,283 | A | 9/1974 | Beichel et al. | |
| 3,919,509 | A * | 11/1975 | Schnitzius | 200/61.62 |
| 4,373,707 | A * | 2/1983 | Molders | 267/64.12 |
| 4,590,816 | A * | 5/1986 | Weyer | 74/89.35 |
| 5,448,856 | A * | 9/1995 | Moore et al. | 49/340 |
| 5,505,097 | A * | 4/1996 | Suovaniemi et al. | 73/864.18 |
| 5,819,632 | A | 10/1998 | Moody et al. | |
| 5,944,376 | A | 8/1999 | Buchanan, Jr. | |
| 6,516,567 | B1 | 2/2003 | Stone et al. | |
| 6,553,617 | B1 * | 4/2003 | Salice | 16/85 |
| 6,707,173 | B2 | 3/2004 | Bauman | |
| 2004/0201154 | A1 * | 10/2004 | Salice | 267/205 |

FOREIGN PATENT DOCUMENTS

| | | |
|---|---|---|
| DE | 44 42 547 | 6/1996 |
| DE | 198 19 377 | 11/1999 |
| DE | 199 34 764 | 2/2001 |
| GB | 864373 | 4/1961 |
| JP | 01 299365 | 12/1989 |
| JP | 2001 116101 | 4/2001 |
| JP | 2002 213406 | 7/2002 |

OTHER PUBLICATIONS

International Search Report, Sep. 1, 2005.

* cited by examiner

*Primary Examiner* — Christopher Schwartz
(74) *Attorney, Agent, or Firm* — Carlson Gaskey & Olds P.C.

(57) ABSTRACT

An improved gas spring has a drive motor for driving a piston. A piston head has a thread at an outer periphery that is guided along a mating thread in an inner periphery of a cylinder. The piston is caused to rotate relative to the cylinder, and is guided for reciprocating movement. In this manner, a drive motor is incorporated into the gas spring such that the gas spring has both a driven and a manual mode. The inventive gas spring has particular application in attaching a vehicle closure to a vehicle frame.

21 Claims, 1 Drawing Sheet

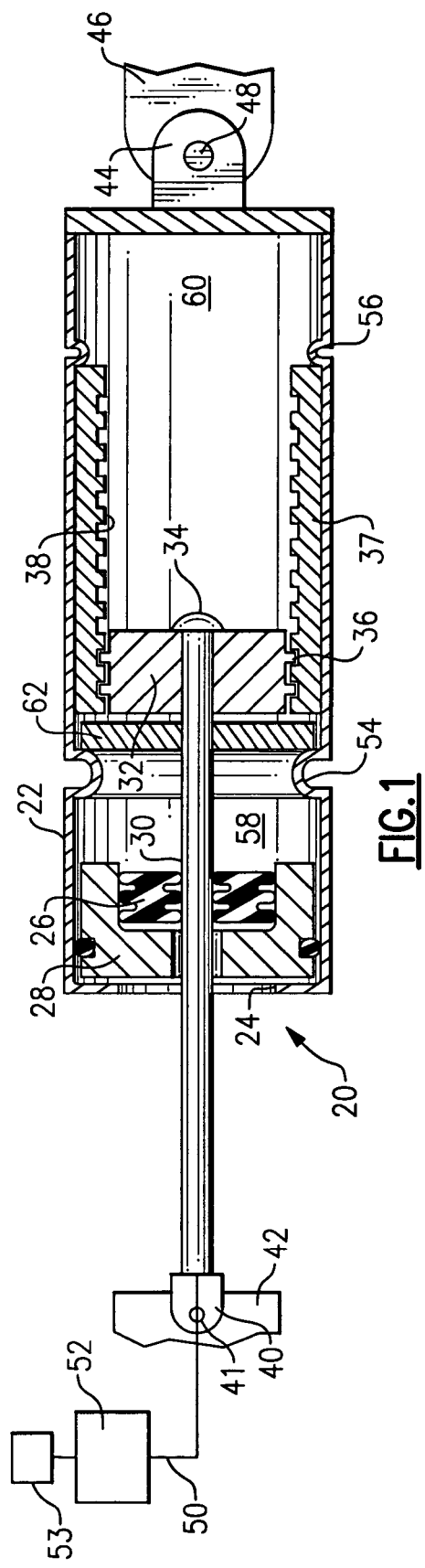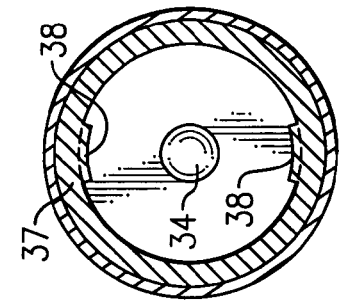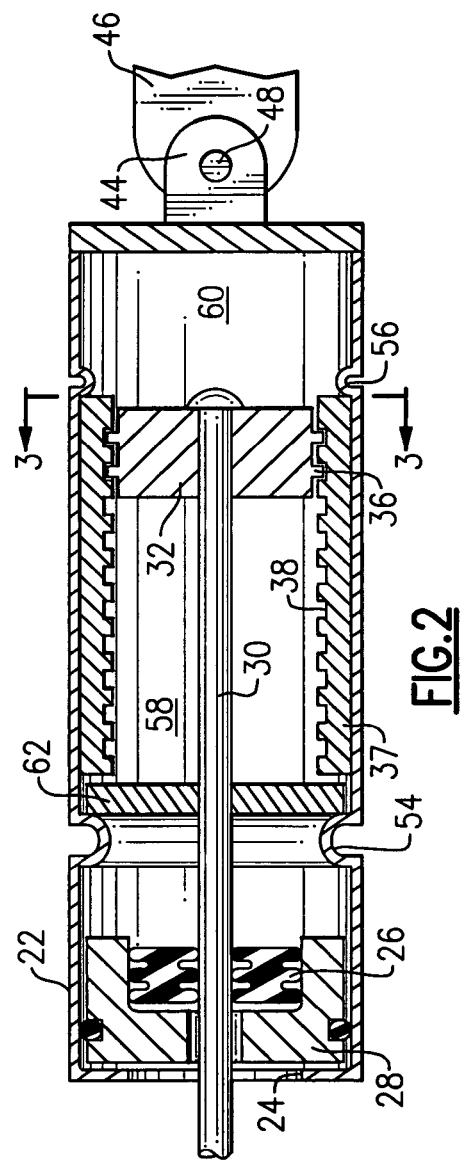

GAS SPRING WITH INTEGRATED LEAD SCREW DRIVE

BACKGROUND OF THE INVENTION

This invention relates to a gas spring having a lead screw drive within a cylinder, and wherein the gas spring provides both a driven and manual mode.

Gas springs are utilized to cushion and control movement between a movable member and a fixed frame. One major application of gas springs is in connecting a vehicle closure to the vehicle frame. As an example, rear lift gates, hatchbacks, etc. typically include a gas spring at each lateral side that drive and cushion movement of the closure between open and closed positions.

One additional feature sometimes used in combination with a gas spring is a drive mechanism for driving the closure, such as when an operator requests the closure be moved between the open and closed positions. The drive mechanism typically includes a motor and linkage separate from the gas spring. The gas spring still assists movement of the closure, and will hold the closure at the open position. However, the motor drives the linkage to move the closure between the open and closed positions, and provides a good deal of the drive force.

SUMMARY OF THE INVENTION

In a disclosed embodiment of this invention, a gas spring is provided with a cylinder, and a piston including a piston rod and piston head. The piston is movable within the cylinder between an extended and a retracted position. The piston head preferably has a screw thread at an outer periphery that is engaged with a screw thread at an inner periphery of the cylinder forming a threaded connection between the piston and the cylinder. A seal is provided between the piston rod and the cylinder. The piston rod, which moves inwardly and outwardly of a bore in the cylinder, has a standard cylindrical outer periphery, and no screw thread. In this manner, the piston rod may be easily sealed in the cylinder. That is, at least a portion of the piston rod that is movable inwardly and outwardly through the seal, has a standard cross-section, and preferably a cylindrical cross-section. The screw thread of the piston is within the cylinder throughout the stroke of the piston.

The piston rod is preferably attached to a rotating drive, such as through a flex connection. As the piston rod rotates, the piston head rotates. When the piston head rotates within the threaded connection to the cylinder, the piston is caused to reciprocate within the cylinder. As known, compressed gas within the gas spring aids in driving the piston relative to the cylinder while the rotating drive is driving the piston rod. The gas spring is also operable in a manual mode in which manual force and compressed gas forces drive the piston to rotate and reciprocate relative to the cylinder, without the rotating drive.

In a most preferred application, the piston rod is attached to a frame for a vehicle, and the cylinder is attached to a movable closure. The inventive gas spring thus allows both driven and manual movement of a closure relative to a vehicle frame.

These and other features of the present invention can be best understood from the following specification and drawings, the following of which is a brief description.

BRIEF DESCRIPTION OF THE DRAWINGS

FIG. 1 shows the inventive gas spring in its extended position.

FIG. 2 shows the gas spring having moved to its retracted position.

FIG. 3 is a cross-sectional view along line 3-3 as shown in FIG. 2.

DETAILED DESCRIPTION OF THE PREFERRED EMBODIMENT

A gas spring 20 is illustrated in FIG. 1. As shown, a cylinder 22 has an outer end 24, and a seal 26 received in a seal packing or housing 28. The seal 26 seals on an outer periphery of a piston rod 30. The outer periphery of the piston rod 30, at least in the area that is movable within the seal 26, has a fixed cross-sectional shape, and is most preferably cylindrical. The piston rod 30 is attached to a piston head 32 through a connection 34. As shown, a thread 36 is formed on an outer periphery of the piston head 32. A cylinder liner 37 is formed with a mating thread 38 at its inner periphery. The cylinder liner 37 is fixed within the cylinder 22.

A pivot mount 40 includes a pivot pin 41 supporting the piston rod 30. The pivot mount 40 is shown schematically attached to a frame 42 of a vehicle. The cylinder 22 is attached by a mount 44 to a moving closure 46 (shown schematically) at a pivot point 48. The moving closure 46 may be a lift gate for a mini-van, for example.

A flex connection 50 is connected to a rotary motor 52, and drives the piston rod 30 to rotate. An indentation or series of indentations 54 locks one end of the cylinder liner 37 within the cylinder 22. An opposed indentation 56 locks the other end of the cylinder liner 37. The cylinder liner 37 is also prevented from rotating. Gas cylinder chambers 58 and 60, and a separating plate 62 are formed within the gas spring 20, as known.

The gas spring 20 is shown in its extended position in FIG. 1. When it is desired to move the gas spring 20 to its retracted position, such as when it is desired to move the moving closure 46 to seat against the frame 42, the rotary motor 52 is actuated to drive the piston rod 30 to rotate. An operator can request this movement through a switch 53. As the piston rod 30 rotates, it rotates the piston head 32. The interaction between the threads 36 and 38 cause the piston head 32 to reciprocate within the cylinder 22, and in particular to move to the right from the position shown in FIG. 1, and toward the position shown in FIG. 2. As the rotary motor 52 drives the piston head 32 to rotate, compressed gasses in the gas cylinder chamber 58 assist in driving the piston head 32 to the right. The operation of the compressed gas within the cylinder 22 is as known.

As shown in FIG. 2, the piston head 32 has now moved to the right. The gas spring 20 has a smaller overall length. The FIG. 2 position is typically associated with the moving closure 46 being seated against the frame 42. As can be appreciated, the outer periphery of the piston rod 30, and in particular the portion that is movable within the seal 26 between the FIG. 1 and FIG. 2 positions, has a relatively fixed cross-sectional area, and is preferably cylindrical. In this manner, there is no difficulty in sealing the piston rod 30 at the seal 26, as might be encountered should there be a thread on the piston rod 30 at this location.

As shown in FIG. 3, the cylinder liner 37 may be formed as one piece with its threads 38. Of course, other arrangements may also be utilized to form the cylinder liner 37.

The gas spring 20 is also operable in a manual mode where manual force and the gas forces cause the piston head 32 to rotate and thus reciprocate.

Although preferred embodiments of this invention has been disclosed, a worker of ordinary skill in this art would recognize that certain modifications would come within the scope of this invention. For that reason, the following claims should be studied to determine the true scope and content of this invention.

What is claimed is:

1. A gas spring comprising:
a cylinder having a closed end at one end, and a bore at an opposed end;
a piston including a piston rod attached to a piston head, said piston being movable through a stroke, with said piston head received within said cylinder, and said piston rod movable inwardly and outwardly of said bore, said piston rod is attached to a motor to cause said piston rod to rotate, and to in turn cause said piston head to rotate; and
a threaded connection between said piston head and said cylinder, such that when said piston head is caused to rotate within said cylinder, said threaded connection causes said piston head to reciprocate within said cylinder.

2. The gas spring as set forth in claim 1, wherein said threaded connection includes said piston head having a screw thread at an outer periphery, and said cylinder having a mating screw thread at an inner periphery.

3. The gas spring as set forth in claim 2, wherein a separate liner is received within said cylinder to provide said mating screw thread on said inner periphery of said cylinder.

4. The gas spring as set forth in claim 1, wherein said motor is connected to said piston rod by a flex connection.

5. The gas spring as set forth in claim 1, wherein said piston rod is adapted to be mounted to a frame on a vehicle, and said one end of said cylinder is adapted to be mounted on a moving closure in the vehicle.

6. A gas spring comprising:
a cylinder having a closed end at one end, and a bore at an opposed end;
a piston including a piston rod attached to a piston head, said piston being movable through a stroke, with said piston head received within said cylinder, and said piston rod movable inwardly and outwardly of said bore; and
a threaded connection between said piston and said cylinder, such that when said piston is caused to rotate within said cylinder, said threaded connection causes said piston to reciprocate within said cylinder, and wherein a threaded portion of said piston is within said cylinder throughout said stroke, said piston rod being attached to a motor to cause said piston rod to rotate, and to in turn cause said piston head to rotate.

7. The gas spring as set forth in claim 6, wherein said threaded connection includes said piston head having a screw thread at an outer periphery, and said cylinder having a mating screw thread at an inner periphery.

8. The gas spring as set forth in claim 7, wherein a separate liner is received within said cylinder to provide said mating screw thread on said inner periphery of said cylinder.

9. The gas spring as set forth in claim 6, wherein said motor is connected to said piston rod by a flex connection.

10. The gas spring as set forth in claim 6, wherein said piston rod is adapted to be mounted to a frame on a vehicle, and said one end of said cylinder is adapted to be mounted on a moving closure in the vehicle.

11. A gas spring comprising:
a cylinder having a closed end at one end, and a bore at an opposed end;
a piston including a piston rod attached to a piston head, said piston being movable through a stroke, with said piston head received within said cylinder, and said piston rod movable inwardly and outwardly of said bore;
a seal provided between said cylinder and said piston rod; and
a threaded connection between said piston and said cylinder, such that when said piston is caused to rotate within said cylinder, said threaded connection causes said piston to reciprocate within said cylinder, and a portion of said piston rod moves through said seal during said stroke, said portion having a constant cross-sectional shape, said piston rod being attached to a motor to cause said piston rod to rotate, and to in turn cause said piston head to rotate.

12. The gas spring as set forth in claim 11 wherein said threaded connection includes said piston head having a screw thread at an outer periphery, and said cylinder having a mating screw thread at an inner periphery.

13. The gas spring as set forth in claim 12, wherein a separate liner is received within said cylinder to provide said mating screw thread on said inner periphery of said cylinder.

14. The gas spring as set forth in claim 11, wherein said constant cross-sectional shape is cylindrical.

15. The gas spring as set forth in claim 11, wherein said motor is connected to said piston rod by a flex connection.

16. The gas spring as set forth in claim 11, wherein said piston rod is adapted to be mounted to a frame on a vehicle, and said one end of said cylinder is adapted to be mounted on a moving closure in the vehicle.

17. A vehicle closure and support structure comprising:
a vehicle closure for pivotal movement relative to a vehicle frame, said vehicle closure being supported and driven by a piston assembly, said piston assembly comprising:
a cylinder having a closed end at one end, and a bore at an opposed end;
a piston including a piston rod attached to a piston head, said piston being movable through a stroke, with said piston head received within said cylinder, and said piston rod movable inwardly and outwardly of said bore; and
a threaded connection between said piston and said cylinder, such that when said piston is caused to rotate within said cylinder, said threaded connection causes said piston to reciprocate within said cylinder, and wherein a threaded portion of said piston is within said cylinder throughout said stroke, said piston rod being attached to a motor to cause said piston rod to rotate, and to in turn cause said piston head to rotate.

18. The vehicle closure and support structure as set forth in claim 17, wherein said threaded connection includes said piston head having a screw thread at an outer periphery, and said cylinder having a mating screw thread at an inner periphery.

19. The vehicle closure and support structure as set forth in claim 18, wherein a separate liner is received within said cylinder to provide said mating screw thread on said inner periphery of said cylinder.

20. The vehicle closure and support structure as set forth in claim 17, wherein said motor is connected to said piston rod by a flex connection.

21. The vehicle closure and support structure as set forth in claim 17, wherein said vehicle closure is a liftgate.

* * * * *